Aug. 22, 1950     E. W. KLEIN, JR     2,519,663
PLURAL TUBE FILTER
Filed Sept. 7, 1948     2 Sheets-Sheet 1
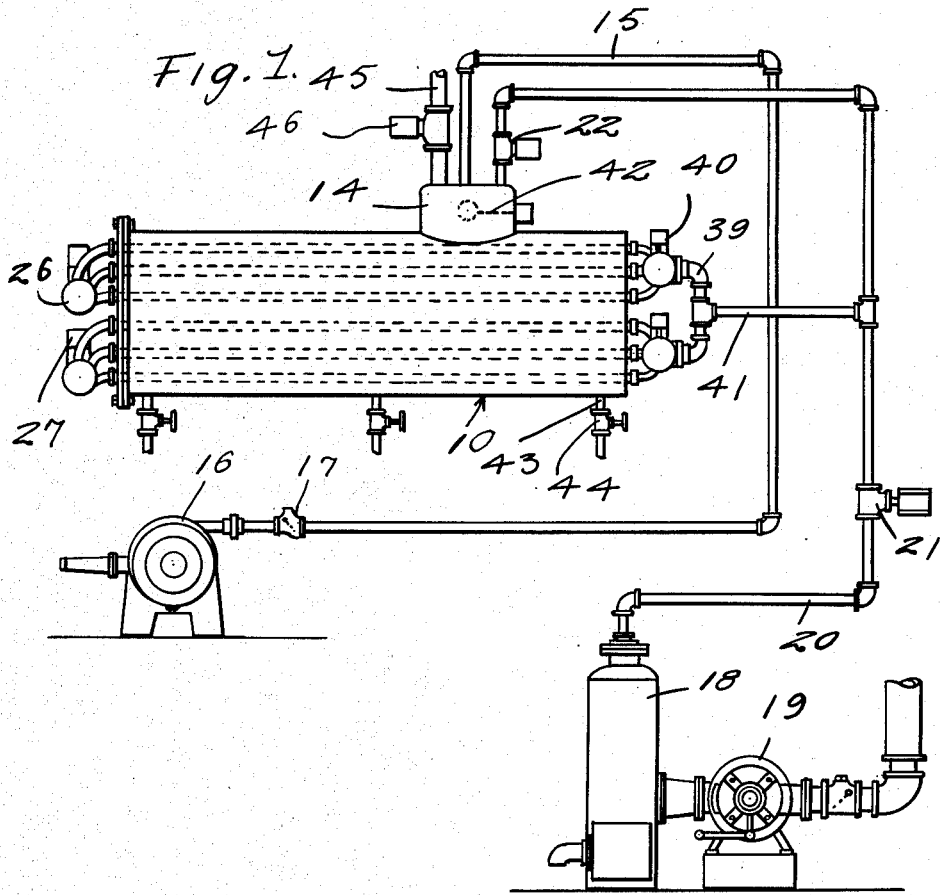
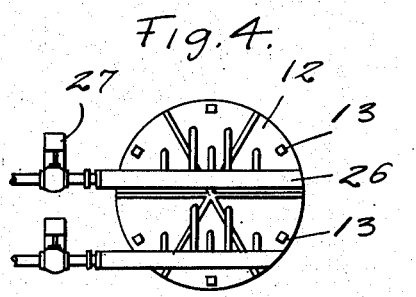
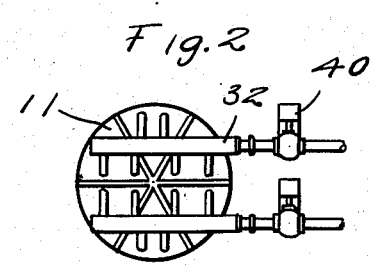
INVENTOR.
E. W. Klein, Jr.
BY
Kimmel & Crowell
Attys.

Aug. 22, 1950  E. W. KLEIN, JR  2,519,663
PLURAL TUBE FILTER
Filed Sept. 7, 1948  2 Sheets-Sheet 2
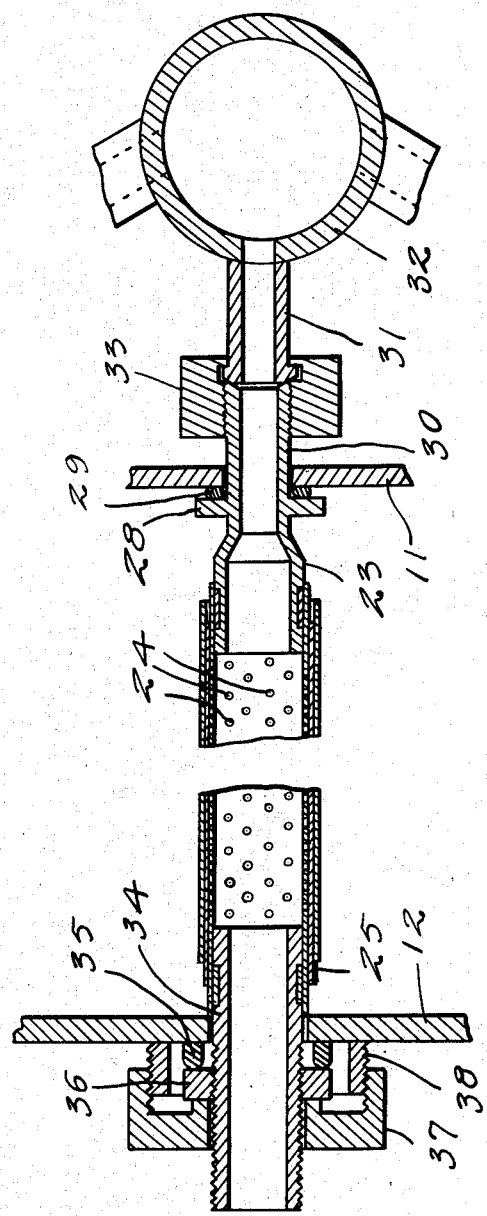
INVENTOR.
E. W. Klein, Jr.
BY
Kimmel & Crowell
Attys.

Patented Aug. 22, 1950

2,519,663

UNITED STATES PATENT OFFICE 2,519,663

PLURAL TUBE FILTER

Edward William Klein, Jr., Atlanta, Ga.

Application September 7, 1948, Serial No. 48,057

3 Claims. (Cl. 210—184)

This invention relates to a pressurized liquid filter.

An object of this invention is to provide a filter for removing solids from liquid in a continuous process.

Another object of this invention is to provide a pressurized filter wherein the filtering medium may be cleaned without removal and the precipitated or removed solids may be removed from the tank in a continuous process.

A further object of this invention is to provide a pressurized filter embodying a plurality of filter tubes which are covered with a filtering medium, such as fabric, the tubes being perforated so that in normal operation the liquid will pass through the filter medium into the tubes. The arrangement for blowing back to clean the filter medium is such that the pressure will be evenly distributed to all of the tubes and over the complete length of each tube in order that the filter mediums of all the tubes will be evenly cleaned.

With the above and other objects in view, my invention consists in the arrangement, combination and details of construction disclosed in the drawings and specification, and then more particularly pointed out in the appended claims.

In the drawings,

Figure 1 is a diagrammatic view of a pressurized filtering system constructed according to an embodiment of this invention, Figure 2 is a detail end elevation of the filtering tank, Figure 3 is a fragmentary longitudinal section through the tank and one of the filtering tubes, Figure 4 is a detail end elevation of the filtering tank at the end opposite from that shown in Figure 2.

Referring to the drawings, the numeral 10 designates generally a cylindrical tank which is provided with an end head 11 at one end thereof and with a second end head 12 removably secured to the tank 10 by means of fastening devices 13.

The tank 10 has mounted on the upper side thereof a dome 14 with which a liquid conveying pipe 15 is adapted to be connected at one end of the latter. The pipe 15 is connected at the opposite end thereof to a pump 16 and a check valve 17 is interposed in the length of the pipe 15 to prevent back flow of the liquid.

An air pressure tank 18 which is connected to a compressor 19 is connected by means of a pipe 20 to the dome 14, and a pressure control device 21 is interposed in the pipe 20 adjacent the pressure tank 18 to govern the operation of the compressor. An electrically operated valve 22 is interposed in the pipe 20 closely adjacent the dome 14.

The tank 10 has mounted therein a plurality of horizontally disposed tubes 23 which extend through the heads 11 and 12 and the tubes 23 are provided with a plurality of openings or perforations 24. Each tube 23 has disposed thereabout one or more layers of tubular filtering fabric 25 which cover the openings 24 and provide a filtering medium whereby the liquid in the combined liquid and solid which is discharged into the tank 10 will be separated from the solid, and the liquid will be removed from the tank through the head 12.

The tubes 23 at their discharge ends are connected to a pair of outlet manifolds 26 and each manifold 26 has associated therewith an electrically operated valve 27. The tubes 23 are sealed in the heads 11 and 12 by providing a flange 28 at one end of each tube confronting the inner side of the head 11 and a sealing gasket 29 is interposed between the flange 28 and the head 11.

A threaded nipple 30 extends through the head 11 and is coupled to a nipple 31 carried by a blow back manifold 32 disposed exteriorly of the head 11. A nut 33 which is swivelly carried by the nipple 31 is threaded onto the nipple 30 for detachably coupling the two nipples 30 and 31 together. At the opposite end of each tube 23 a nipple 34 extends through the head 12 and is sealed with respect to the head 12 by means of a gasket 35 interposed between the outer side of the head 12 and a nut 36 which is threaded on the nipple 34. A second nut 37 loosely engages about the outer end of the nipple 34 bearing against the outer side of the nut 36, and the nut 37 is threaded onto a nipple 38 which is welded or otherwise fixedly carried by the head 12. Tightening of the nut 37 will force the nipple 34 inwardly to compress both gaskets 29 and 35.

There are one or more blow back manifolds disposed one above the other as shown in Figure 2, and these manifolds are connected together by means of a connecting pipe 39. Each manifold 32 has associated therewith an electrically operated valve 40 so that the manifolds 32 may be separately cut off or communicated with a pipe 41 which connects the connecting member 39 with the air pressure pipe 20.

In the use and operation of this system, the combination liquid and solids are pumped by the pump 16 and discharged into the tank 10 through the pipe 15. The level of the combined liquid and solids in the tank 10 is regulated by means of a float control member 42 which is preferably connected with the operator for the pump 16. At the same time that the combined liquid and solids are being discharged into the tank 10, air pressure is maintained on the tank 10 from the air pressure tank 18 through the pipe 20.

Valve 22 is open during the normal operation of the system and at this time valves 40 connected with the manifolds 32 are closed. Valves 27 are open and the pressure of air in the tank 10 is slightly less than the pressure of the combined liquid and solids. The tank 10 has connected to the lower portion thereof a plurality of outlet pipes 43 with which manually operable valves 44 are connected so that the solids removed from the liquid may be discharged in a continuous process at predetermined rates. The dome 14 has extending upwardly therefrom a vent pipe 45 in which an electrically operated valve 46 is interposed. During the normal operation of the system, valve 46 is closed so that the desired pressure may be maintained within the tank 10. When it is desired to clean the filtering mediums or sleeves 25, the pump 16 is cut off and valves 22 and 27 are closed. Valves 40 are opened so that the air pressure from tank 18 will be communicated to the manifolds 32 and into the interior of the tubes 23. This air pressure will put a reverse pressure on the filter mediums or sleeves 25 so as to blow off or otherwise clean the fabrics.

With a filtering system as hereinbefore described, solids may be removed from liquids in the continuous process under predetermined pressure.

I do not means to confine myself to the exact details of construction herein disclosed, but claim all variations falling within the purview of the appended claims.

What I claim is:

1. A filter comprising a tank having opposite end walls, a plurality of perforate tubes disposed longitudinally in said tank and having the opposite ends thereof extending through said end walls, each of said tubes including an annular flange extending radially therefrom inwardly of one of said end walls, a sealing member interposed between said flange and said one of said end walls, a nut member threaded on the other end of said tube outwardly of the other of said end walls, a second sealing member interposed between said other end wall and said nut member, and means carried by said other end wall engaging said nut member and adapted to urge said tube towards said one of said end walls for compressing said first and second sealing members.

2. A filter comprising a tank having opposite end walls, a plurality of perforate tubes disposed in said tank and having the opposite ends extending through said end walls, each of said tubes including an annular flange formed thereon inwardly of one of said end walls, a nut member threaded on the opposite end of the tube outwardly of the other end wall, sealing means interposed between said flange and said one end wall and between said nut member and said other end wall, and means carried by said other end wall engageable with said nut member and adapted to move said tube towards said one end wall for compressing said sealing means to thereby seal said end walls.

3. A filter according to claim 2 wherein said last named means includes a cylindrical externally threaded member extending outwardly from said other end wall concentrically with said opposite end of said tube, and an annular plate loosely engaging on said opposite end and having a right angular peripheral flange internally threaded and engaging on said cylindrical member, threading said plate towards said other end wall effecting engagement of said plate with said nut member for urging said tube towards said one end wall.

EDWARD WILLIAM KLEIN, Jr.

REFERENCES CITED

The following references are of record in the file of this patent:

UNITED STATES PATENTS

| Number | Name | Date |
| --- | --- | --- |
| 930,167 | Endler | Aug. 3, 1909 |
| 2,016,163 | Wilderman | Oct. 1, 1935 |
| 2,035,592 | Christensen | Mar. 31, 1936 |
| 2,113,923 | Miller | Apr. 12, 1938 |
| 2,301,803 | Davis | Nov. 10, 1942 |